United States Patent
Jeong et al.

(10) Patent No.: US 7,480,519 B2
(45) Date of Patent: Jan. 20, 2009

(54) CELL RESELECTION METHOD AND APPARATUS FOR PREVENTING PING-PONG IN A MOBILE COMMUNICATIONS SYSTEM

(75) Inventors: Kyeong-In Jeong, Suwon-si (KR); Gert Jan Van Lieshout, Middlesex (GB); Kook-Heui Lee, Yongin-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 491 days.

(21) Appl. No.: 11/372,467

(22) Filed: Mar. 10, 2006

(65) Prior Publication Data
US 2006/0258386 A1 Nov. 16, 2006

(30) Foreign Application Priority Data
Mar. 10, 2005 (KR) ........................ 10-2005-0020101

(51) Int. Cl.
*H04Q 7/20* (2006.01)
(52) U.S. Cl. .................... 455/525; 455/436; 455/441
(58) Field of Classification Search .............. None
See application file for complete search history.

(56) References Cited

U.S. PATENT DOCUMENTS 5,701,586 A 12/1997 Tabbane et al.
5,930,721 A * 7/1999 Fried et al. ................ 455/466
6,996,400 B2 * 2/2006 Posti et al. ................ 455/450
7,016,680 B2 * 3/2006 Yagi ........................ 455/441

FOREIGN PATENT DOCUMENTS

EP 1 286 564 A1 2/2003

* cited by examiner

*Primary Examiner*—Erika A Gary
(74) *Attorney, Agent, or Firm*—Roylance, Abrams, Berdo & Goodman, LLP

(57) ABSTRACT

A method and apparatus are provided for enabling a UE to perform accurate and efficient cell reselection in a cellular mobile communications system. If reselection to the same cell is repeated, the UE releases itself from a high-speed UE state or excludes the number of reselections to the same cell from the number of cell changes counted for a duration set for deciding as to the high-speed UE state, according to a ping-pong duration threshold and a ping-pong occurrence number threshold. The UE uses a non-scaled down cell reselection time limit in a non-high-speed UE state, and a scaled-down cell reselection time limit in the high-speed UE state. Thus, the UE reselects to a non-serving cell having the highest ranking continuously for the cell reselection time limit.

16 Claims, 8 Drawing Sheets

CELL RESELECTION METHOD AND APPARATUS FOR PREVENTING PING-PONG IN A MOBILE COMMUNICATIONS SYSTEM

CROSS-REFERENCE TO RELATED APPLICATIONS

This application claims the benefit under 35 U.S.C. §119 (a) of Korean Patent Application No. 10-2005-0020101 entitled "Cell Reselection Method and Apparatus for Preventing Ping-Pong in a Mobile Communications System" filed in the Korean Intellectual Property Office on Mar. 10, 2005, the entire disclosure of which is incorporated herein by reference.

BACKGROUND OF THE INVENTION

1. Field of the Invention

The present invention relates generally to a mobile communications system. In particular, the present invention relates to a system and method of enabling a User Equipment (UE) to reselect to a cell accurately and efficiently.

2. Description of the Related Art

Today's mobile communications systems as being developed, are moving toward high-speed, high-quality wireless data packet communications systems for providing data service and multimedia service beyond the traditional voice-oriented service. Particularly, Universal Mobile Telecommunication Service (UMTS), a $3^{rd}$ generation mobile communication system using Wideband Code Division Multiple Access (WCDMA) based on the European Global System for Mobile communications (GSM) system, provides mobile subscribers or computer users with a uniform service of transmitting packet-based text, digitized voice, and video and multimedia data at or above 2 Mbps, irrespective of their locations around the world.

The UMTS system includes a Core Network (CN) and a plurality of Radio Network Subsystems (RNSs). The RNSs form a UMTS Terrestrial Radio Access Network (UTRAN). Each RNC has a Radio Network Controller (RNC) and a plurality of Node Bs. The RNCs are classified as a serving RNC (SRNC), a drift RNC (DRNC), and a controlling RNC (CRNC) according to their roles. The SRNC is responsible for management of information about UEs and data transmission to the CN. The DRNC is wirelessly connected to a UE directly. The CRNC controls the radio resources of individual Node Bs.

The RNCs each assign radio resources to a plurality of Node Bs under their control, and the Node Bs provide the assigned radio resources to UEs. The radio resources are configured on a cell basis, and radio resources provided by each Node B are those of a particular cell managed by the Node B. A UE establishes a radio channel with radio resources available to its serving cell and transmits/receives data on the radio channel. The distinction between the Node B and the cell is of little importance to the UE because the UE is aware of only physical channels configured on a cell basis. Therefore, the terms "Node B" and "cell" are interchangeably used herein.

When a UE having no dedicated channels established moves from one cell to another, a cell reselection is triggered. The UE measures the strengths of signals received from neighbor cells, reports the measurements, and finally selects/reselects a cell in a cell reselection procedure. The cell reselection procedure aims to accurately detect the best cell on which the UE will camp and set the best cell as a serving cell for the UE.

For cell reselection, the UE first acquires a neighbor cell list for inter-cell, intra-cell and inter-Radio Access Technology (RAT) cell reselection from a System Information Block (SIB) received from a serving cell on a Broadcast CHannel (BCH). The UE then measures the strengths of signals received from neighbor cells and calculates S_criteria values and R values for cell reselection. The UE selects the best suitable cell according to R value-based cell rankings. The cell reselection criteria are described in greater detail below.

If the UE has camped on the current serving cell for longer than one second and the highest-ranked cell in the neighbor cell list is kept higher in ranking than the current serving cell for a predetermined period of time $T_{reselection}$, the UE reselects to the highest-ranked cell as a serving cell. The period of time $T_{reselection}$, which the UE receives in an SIB, is set so as to prevent the UE from reselecting to an instantly higher-ranked cell and thus avoiding a "ping-pong effect", that is, the repeated handover between cells in a relatively short time.

The period $T_{reselection}$ is different for a high-speed UE and a low-speed UE. The period $T_{reselection}$ set in an SIB is applied to the low-speed UE, whereas the high-speed UE scales down this $T_{reselection}$ value. How much the $T_{reselection}$ is scaled down is determined according to an "intra-frequency Scaling Factor for $T_{reselection}$", that is also notified by an SIB. For example, given a $T_{reselection}$ value of 5 s (seconds) and a scaling factor of 0.2, $T_{reselection}$ for the high-speed UE is 1 s (1=5×0.2). In a non-Hierarchical Cell Structure (non-HCS), if the UE changes its serving cell more than nonHCS- $N_{cr}$ times for a predetermined period nonHCS- $T_{crmax}$, it considers itself a high-speed UE. The nonHCS- $T_{crmax}$ and nonHCS- $N_{cr}$ are also indicated by an SIB.

However, in the case where the UE enters a handover region where cell areas are overlapped and becomes stationary or moves slowly, the number of cell changes may increase due to frequent cell reselections in the handover region. Thus, the UE uses a scaled-down $T_{reselection}$ in the high-speed UE state. As the UE repeats cell reselection for each scaled-down $T_{reselection}$, the ping-pong effect becomes more serious.

Accordingly, a need exists for a system and method of enabling a User Equipment (UE) to reselect to a cell more accurately and efficiently.

SUMMARY OF THE INVENTION

An object of embodiments of the present invention is to substantially solve at least the above problems and/or disadvantages, and to provide at least the advantages below. Accordingly, embodiments of the present invention provide a method and apparatus for accurately determining whether a UE is a high-speed UE by detecting the ping-pong effect which may occur in cell reselection.

Embodiments of the present invention preferably provide a method of signaling parameters by which a UE can detect ping-pong in cell reselection, a UE operation in relation to the parameters, and a UE configuration for the UE operation.

Embodiments of the present invention preferably provide a method and apparatus for enabling a UE to accurately and efficiently reselect to a cell by detecting ping-pong in cell reselection.

According to one aspect of embodiments of the present invention, a cell reselection method is provided for preventing ping-pong in a mobile communications system wherein, if the number of cell reselections is equal to or larger than an occurrence number threshold $N_{cr}$ for a duration threshold $T_{crmax}$, a UE considers itself a high-speed UE and performs cell reselection according to a first cell reselection time limit, $T_{reselection}$ 1. The UE is set to a non-high-speed state if the number of cell reselections to the same cell during a predetermined ping-pong duration $T_{ping-pong}$ exceeds a predetermined same cell reselection occurrence number threshold $N_{ping-pong}$. In the non-high-speed state, the UE selectively performs cell reselection according to a second cell reselection time limit, $T_{reselection}$ 2, which is preferably longer than $T_{reselection}$ 1.

According to another aspect of embodiments of the present invention, a cell reselection method is provided for preventing ping-pong in a mobile communications system wherein, if the number of cell reselections is equal to or larger than an occurrence number threshold $N_{cr}$ for a duration threshold $T_{crmax}$, a UE considers itself a high-speed UE and performs cell reselection according to a first cell reselection time limit, $T_{reselection}$ 1. If the number of cell reselections to the same cell during a predetermined ping-pong duration $T_{ping-pong}$ exceeds a predetermined same cell reselection occurrence number threshold $N_{ping-pong}$, the number of cell reselections or the number of reselections to the same cell for $T_{ping-pong}$ is excluded from the number of cell reselections for $T_{crmax}$. If the number of cell reselections for $T_{crmax}$ does not exceed $N_{cr}$, the UE is set to a non-high-speed state. In the non-high-speed state, the UE selectively performs cell reselection according to a second cell reselection time limit, $T_{reselection}$ 2, which is preferably longer than $T_{reselection}$ 1.

BRIEF DESCRIPTION OF THE DRAWINGS

The above and other objects, features and advantages of embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Exemplary embodiments of the present invention will be described herein below with reference to the accompanying drawings. In the following description, well-known functions or constructions are not described in detail since they would obscure the invention in unnecessary detail.

Figure 1:
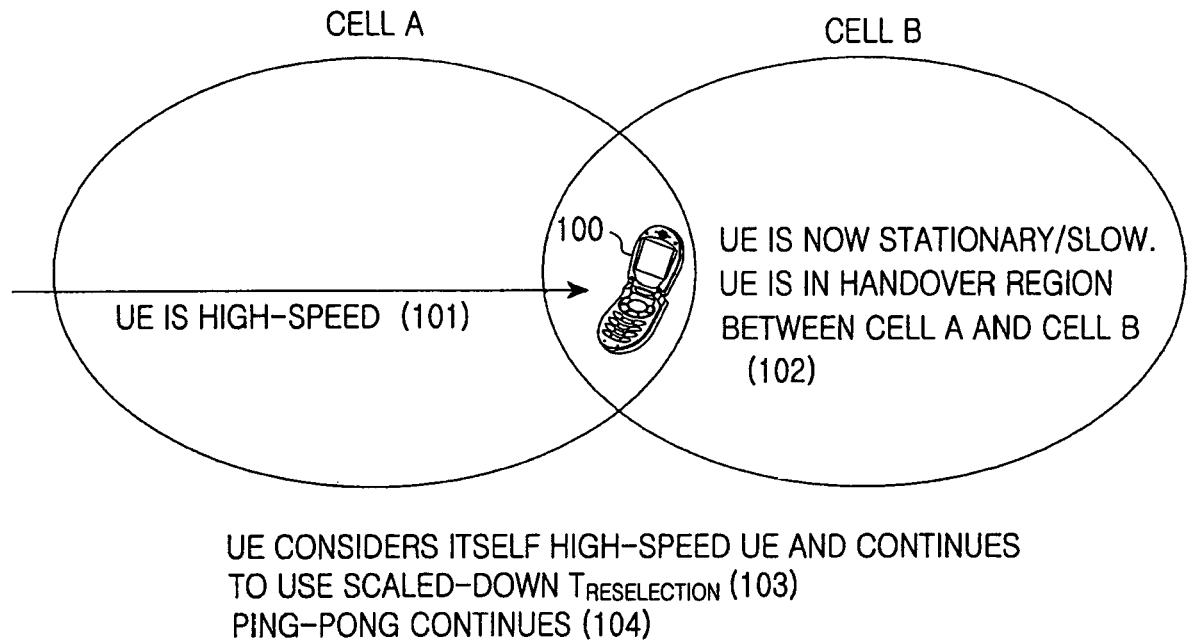
FIG. 1 illustrates an exemplary cell environment of a cellular mobile communications system.

FIG. 1 illustrates an exemplary cell environment for a cellular mobile communications system to which embodiments of the present invention can be applied. The illustrated cell environment comprises a non-HCS environment where Cell A and Cell B are at the same level. In practice, handover regions may overlap among more cells at the same level in the non-HCS environment. The level of a cell refers to the hierarchical class of the cell, determined by the geographical size or logical ranking of the cell. Since the cell classes are out of the scope of the present invention, their detailed description is not provided herein. It is also to be appreciated that embodiments of the present invention are not limited to the non-HCS environment.

Referring to FIG. 1, a UE 100 moves from Cell A toward Cell B at a high speed. For illustration purposes, Cell A is a serving cell and Cell B is a neighbor cell. As the UE 100 enters a handover region between Cell A and Cell B, it performs cell reselection in compliance with the $3^{rd}$ Generation Partnership Project (3GPP) standards. While only one neighbor cell is shown in FIG. 1, the UE 100 preferably performs the cell reselection with respect to a plurality of neighbor cells in an actual implementation of embodiments of the present invention.

The 3GPP standards specify cell reselection criteria for a UE while in an idle mode, a UMTS Routing Area (URA)/CELL_Paging CHannel (PCH) mode, or a URA/CELL_Forward Access CHannel (FACH) mode. The cell reselection criteria are different for intra-frequency, inter-frequency, and inter-RAT cell reselections.

If the received signal strength Sx of Cell A is equal to or less than a signal strength threshold Sintrasearch, Sintersearch or Ssearchratm received in an SIB from Cell A, the UE 100 measures signals and performs intra-frequency, inter-frequency, or inter-RAT cell reselection. Sintrasearch, Sintersearch and Ssearchratm are respective thresholds for the intra-frequency, inter-frequency, and inter-RAT cell reselections.

Subsequently, the UE 100 searches for cells satisfying the following criteria, expressed as shown in Equation (1) below, in a neighbor cell list received in SIB11/12 from Cell A. The cell reselection criteria are different for Frequency Division Duplex (FDD) cells and Time Division Duplex (TDD) cells. The cell reselection criteria comprise, but are not limited to, FDD cell: Srxlev>0 and Squal>0

TDD cell: Srxlev>0

Squal=Qqualmeas−Qqualmin

Srxlev=Qrxlevmeas−Qrxlevmin−Pcompensation     (1)

where Srxlev denotes a cell selection reception (Rx) level value (dB) and Squal denotes a cell selection quality value (dB). The Squal value applies only to FDD cells. An Srxlev and Squal value higher than 0 is a minimum qualification for an FDD cell to which the UE can reselect.

The Qqualmeas value denotes a measured cell quality value (dB) which is the chip energy to noise ratio (Ec/No) of a Common Pilot CHannel (CPICH). The Qqualmin value denotes a minimum required quality level in the serving cell (dB), broadcast in an SIB from the serving cell. For Squal higher than 0, the Ec/No of the CPICH (Qqualmeas) from a target cell must be larger than the Qqualmin of the serving cell.

The Qrxlevmeas value denotes a measured cell Rx level value (dBm) which is a Received Signal Code Power (RSCP) for an FDD cell, and the RSCP of a Primary Common Control Physical CHannel (P-CCPCH) for a TDD cell. The Qrxlevmin value denotes a minimum required Rx level value for the serving cell, broadcast in an SIB from the serving cell. The Pcompensation value denotes the greater of "UE_TXPWR_MAX_RACH-P_MAX" and 0. The UE_TXPWR_MAX_RACH value denotes the maximum transmit power of a Random Access CHannel (RACH) from the UE, and P_MAX denotes the total transmit power of the UE. For a Srxlev value higher than 0, the RSCP of the CPICH or P-CCPCH (Qrxlevmeas) from the target cell must be larger than the sum of Qrxlevmin and Pcompensation.

The UE 100 detects suitable cells among the cells satisfying the above conditions. The suitable cells are defined as cells which fulfill the minimum cell reselection criteria S_criteria and on which the UE 100 can camp. The UE 100 determines whether a cell can be camped on by information received in a Master Information block (MIB)/SIB from the cell. If a target cell fulfilling S_criteria belongs to a Public Land Mobile Network (PLMN) managed by a CN operator available to the UE 100, is not barred, and is not in a forbidden Location Area (LA), this target cell can be a suitable cell.

The UE 100 ranks the suitable cells according to their R values expressed as shown in Equation (2) below. If the received signal strength Sx of the serving cell is less than Sintrasearch, which triggers measurement for an intra-frequency cell reselection, the UE 100 measures with respect to neighbor cells using the same frequency as the serving cell. Detecting suitable cells by the measurements, the UE 100 ranks the suitable cells by their R values. The R values comprise, but are not limited to, $$Rs = Qmeas,s + Qhyst,s + Qoffmbms$$

$$Rn = Qmeas,n + Qoffsets,n + Qoffmbms - TOn \times (1-Ln) \quad (2)$$

where Rs denotes the R value of the serving cell and Rn denotes the R value of a neighbor cell. The Qmeas,s value denotes the measurement of the serving cell. It is an average CPICH Ec/No or an average CPICH RSCP for an FDD cell, an average P-CCPCH RSCP for a TDD cell, and an average received signal level in GSM. The Qmeas,n value denotes the measurement of the neighbor cell, Qhyst,s denotes a hysteresis, and Qoffset,n denotes the offset between the serving cell and the neighbor cell. The Qoffmbms value denotes an offset by which the UE, if it uses Multimedia Broadcast/Multicast Service (MBMS), can move to the frequency band of an MBMS service. The Ton value denotes a parameter set for preventing ping-pong in the HCS. The Ln is 0 if the HCS level of the serving cell, i.e. HCS_PRIO, is equal to that of the neighbor cell, and it is 1 if they are different. The Qoffmbms value applies only to the UE receiving the MBMS service and TOn×(1-Ln) applies only in the HCS. Therefore, if the UE 100 does not receive the MBMS service and is of the non-HCS, Equation (2) is simplified to the following Equation (3) below.

$$Rs = Qmeas,s + Qhyst,s$$

$$Rn = Qmeas,n + Qoffsets,n \quad (3)$$

If the UE 100 has camped on the serving cell for longer than a predetermined time (i.e. 1 second) and the highest-ranked cell in the neighbor cell list, that is, the cell having the highest R value (Cell B herein) is kept higher in ranking than the serving cell for the cell reselection time limit, $T_{reselection}$, the UE selects Cell B as a new serving cell.

Referring to FIG. 1, since the UE 100 is moving at high speed from Cell A in step 101, it uses a scaled-down value of $T_{reselection}$ broadcast by an SIB from Cell A. In step 102, the UE 100 is now stationary or moves slowly in the handover region. If a time period set for determining whether the UE 100 is a high-speed UE, $T_{crmax}$ still lasts, the UE 100 does not consider itself a stationary/slow UE and checks $N_{cr}$ in the high-speed UE state in step 103.

Because the UE 100 considers itself a high-speed UE until $T_{crmax}$ expires, although it is actually a stationary/slow UE, it still uses the scaled-down $T_{reselection}$ in cell reselection. As a result, the ping-pong effect is continued in the cell reselection in step 104.

As the UE 100 uses the scaled-down $T_{reselection}$ rather than the original $T_{reselection}$ which prevents the ping-pong for the stationary/slow UE, it reselects to an instantly highest-ranked cell. Therefore, the ping-pong occurs in the cell reselection. For example, the UE 100 must use a $T_{reselection}$ value of 5 s in order to stably reselect to a cell with a constantly high received signal strength. If the UE 100 uses a scaled-down $T_{reselection}$ value of 1 s instead, it alternates between Cell A and Cell B every 1 s due to rapid fluctuations in the received signal strengths from Cell A and Cell B in the handover region.

As illustrated in FIG. 1, if ping-pong occurs, the serving cell may change more than $N_{cr}$ times before $T_{crmax}$ expires because $N_{cr}$ is counted inclusive of cell reselections to the same cell. Mistaking itself as moving fast, the UE 100 uses the scaled-down $T_{reselection}$ value, thereby continuing the ping-pong effect. For $N_{cr}=8$, if cell reselection occurs more than eight times for $T_{crmax}$ in the pattern of A, B, A, B, A, B . . . every 1 second, the UE continuously uses the scaled-down $T_{reselection}$ value, wrongly considering itself a high-speed UE. As a result, the ping-pong effect continues.

At least three embodiments of the present invention are presented herein to detect the ping-pong illustrated in FIG. 1. The following description is made with the appreciation that the parameters used herein are defined in relation to their functions in embodiments of the present invention and thus, they may vary depending on the intention of the user or the operator or depending on their practical usage.

In a first exemplary embodiment of the present invention, a ping-pong duration threshold $T_{ping-pong}$ and a ping-pong occurrence number threshold $N_{ping-pong}$ are used. If the same cell is selected more than $N_{ping-pong}$ times for $T_{ping-pong}$, the UE determines the occurrence of the ping-pong and gets out of the high-speed UE state. Alternatively, if the same cell is selected more than $N_{ping-pong}$ times for $T_{ping-pong}$, the UE excludes the number of cell changes (i.e. the number of cell reselections) counted for $T_{ping-pong}$ from a comparison with $N_{cr}$. The $T_{ping-pong}$ period is shorter than $T_{crmax}$, and $N_{ping-pong}$ is less than $N_{cr}$.

A second exemplary embodiment of the present invention is characterized by the use of either $T_{ping-pong}$ or $N_{ping-pong}$. In the former case, if the same cell is selected at least twice for $T_{ping-pong}$, the UE releases itself from the high-speed UE state or excludes the number of cell changes counted for $T_{ping-pong}$ from a comparison with $N_{cr}$. In the latter case, if the number of reselections to the same cell for $T_{crmax}$ exceeds $N_{ping-pong}$, the UE excludes the number of reselections to the same cell for $T_{crmax}$ from a comparison with $N_{cr}$. Notably, the number of reselections to the same cell is counted as 1. The $T_{ping-pong}$ value is shorter than $T_{crmax}$, and $N_{ping-pong}$ is less than $N_{cr}$.

A third exemplary embodiment of the present invention uses $T_{crmax}$. If the UE reselects to the same cell for $T_{crmax}$, it excludes the number of reselections to the same cell from a comparison with $N_{cr}$. Notably, the number of reselections to the same cell is counted as 1.

First Exemplary Embodiment

Figure 2:
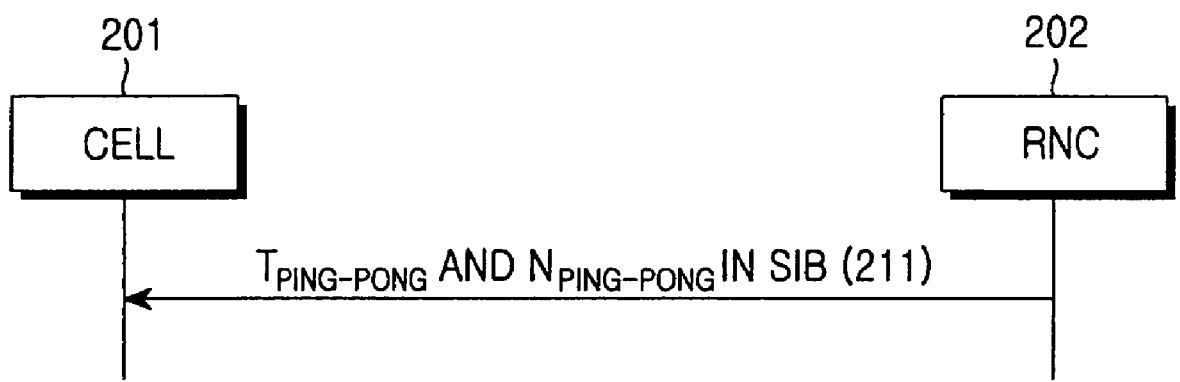
FIG. 2 is a diagram illustrating an exemplary signaling flow according to an embodiment of the present invention.

FIG. 2 is a diagram illustrating an exemplary signaling flow according to an embodiment of the present invention. Reference numeral 201 denotes a serving cell for a UE and reference numeral 202 denotes the CRNC of the cell 201.

Referring to FIG. 2, the CRNC, or simply RNC 202 sends appropriately set $T_{ping\text{-}pong}$ and $N_{ping\text{-}pong}$ values in an SIB to the cell 201 in order to enable UEs to decide about the occurrence of ping-pong which may be caused by a scaled-down $T_{reselection}$ value in step 211. The cell 201 broadcasts the SIB with $T_{ping\text{-}pong}$ and $N_{ping\text{-}pong}$. The UEs in idle mode, URA/CELL_PCH mode, and URA/CELL_FACH mode within the cell 201 receive and store the broadcast $T_{ping\text{-}pong}$ and $N_{ping\text{-}pong}$. While not shown, the SIB further comprises other parameters by which to determine cell reselection, particularly $T_{crmax}$ and $N_{cr}$. The $T_{ping\text{-}pong}$ and $N_{ping\text{-}pong}$ values are preferably shorter than $T_{crmax}$ and $N_{cr}$, respectively.

If the UE reselects to the same cell more than $N_{ping\text{-}pong}$ times for $T_{ping\text{-}pong}$, it releases itself from a high-speed UE state, considering that ping-pong has occurred. If the UE is already in a stationary/slow UE state, it is kept unchanged. Alternatively, the UE excludes the cell change number counted for $T_{ping\text{-}pong}$ from a total cell change number counted for $T_{crmax}$. The $T_{ping\text{-}pong}$ value is preferably set to be shorter than $T_{crmax}$.

Figure 3:
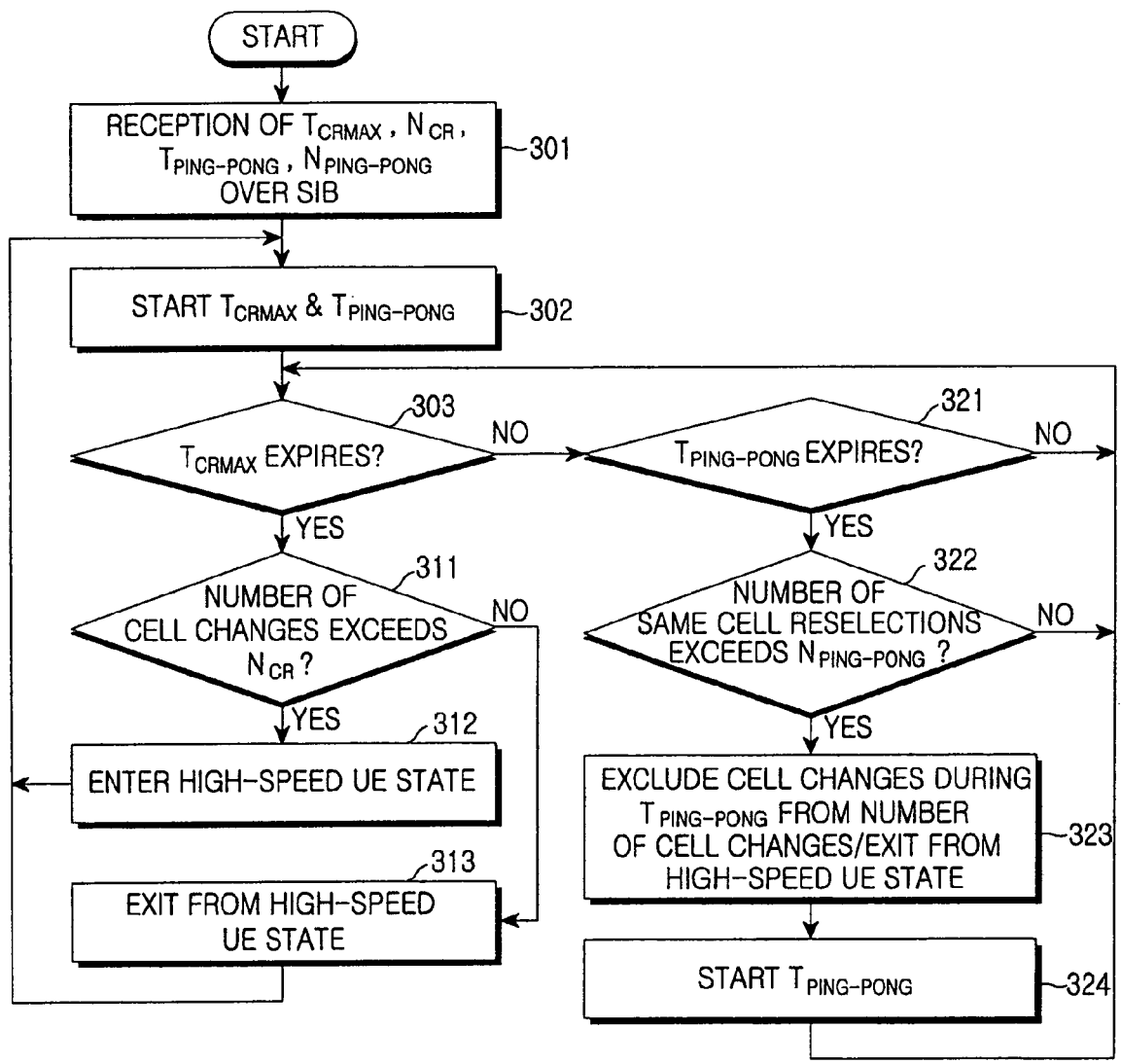
FIG. 3 is a flowchart illustrating an exemplary UE operation according to an embodiment of the present invention.

FIG. 3 is a flowchart illustrating an exemplary UE operation according to an embodiment of the present invention.

Referring to FIG. 3, the UE receives $T_{crmax}$, $N_{cr}$, $T_{ping\text{-}pong}$ and $N_{ping\text{-}pong}$ values in an SIB from the serving cell in step 301, and starts timers set to $T_{crmax}$ and $T_{ping\text{-}pong}$, respectively, in step 302. The $T_{crmax}$ value is a timer value by which to decide a high-speed UE state, and $T_{ping\text{-}pong}$ is a timer value by which to decide the occurrence of ping-pong caused by a scaled-down $T_{reselection}$.

In step 303, the UE monitors the expiration of $T_{crmax}$. If $T_{crmax}$ has not yet expired, the UE monitors the expiration of $T_{ping\text{-}pong}$ in step 321. Upon expiration of $T_{ping\text{-}pong}$, the UE compares a cell change number counted for $T_{ping\text{-}pong}$ with $N_{ping\text{-}pong}$ in step 322. If the cell change number exceeds $N_{ping\text{-}pong}$, the UE releases itself from the high-speed UE state or excludes the cell change number counted for $T_{ping\text{-}pong}$ from a total cell change number counted for $T_{crmax}$ in step 323. The cell change number for $T_{ping\text{-}pong}$ may comprise the number of reselections to the same cell or the number of reselections to different cells. Both available UE operations are described in FIG. 3. In step 324, the $T_{ping\text{-}pong}$ timer is then restarted.

While not shown, if the number of reselections to the same cell for $T_{ping\text{-}pong}$ is equal to or less than $N_{ping\text{-}pong}$ in step 322, the cell change number for $T_{ping\text{-}pong}$ is included in the cell change number for $T_{crmax}$. The cell change number for $T_{crmax}$ is then compared with $N_{cr}$ in order to determine whether the UE is a high-speed UE in step 311.

Upon expiration of $T_{crmax}$ in step 303, the UE compares the cell change number for $T_{crmax}$ with $N_{cr}$ in step 311. If the cell change number exceeds $N_{cr}$, the UE enters the high-speed UE state in step 312. Otherwise, the UE releases itself from the high-speed UE state or is kept in the stationary/slow UE state in step 313.

In the high-speed UE state, the UE reselects to a cell based on a scaled-down $T_{reselection}$ value. If a neighbor cell is maintained higher in ranking than the serving cell for the scaled-down $T_{reselection}$, the UE reselects to the neighbor cell as a new serving cell. If the UE is out of the high-speed UE state, it uses the non-scaled down, that is, the original $T_{reselection}$ value.

Second Exemplary Embodiment

Figure 4:
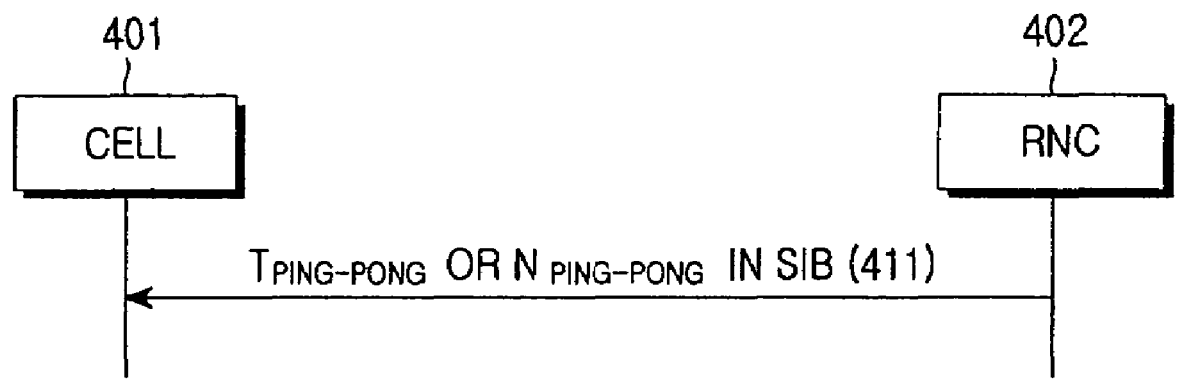
FIG. 4 is a diagram illustrating an exemplary signaling flow according to another embodiment of the present invention.

FIG. 4 is a diagram illustrating an exemplary signaling flow according to another embodiment of the present invention. Reference numeral 401 denotes a serving cell for a UE and reference numeral 402 denotes the CRNC of the cell 401.

Referring to FIG. 4, the CRNC, or simply RNC 402 sends appropriately set $T_{ping\text{-}pong}$ or $N_{ping\text{-}pong}$ values in an SIB to the cell 401 in order to enable UEs to decide about the occurrence of ping-pong which may be caused by a scaled-down $T_{reselection}$ value in step 411. The cell 401 broadcasts the SIB with $T_{ping\text{-}pong}$ or $N_{ping\text{-}pong}$. The UEs within the cell 401 receive and store $T_{ping\text{-}pong}$ or $N_{ping\text{-}pong}$. While not shown, the SIB further comprises other parameters by which to determine cell reselection, particularly $T_{crmax}$ and $N_{cr}$.

In operation, if the UE receives $T_{ping\text{-}pong}$ and selects the same cell at least twice for $T_{ping\text{-}pong}$, it excludes the number of cell changes occurred for $T_{ping\text{-}pong}$ from the number of cell changes counted for $T_{crmax}$. However, if the UE receives $N_{ping\text{-}pong}$, it compares the number of reselections to the same cell for $T_{crmax}$ with $N_{ping\text{-}pong}$. If the cell reselection number for $T_{crmax}$ exceeds $N_{ping\text{-}pong}$, the UE releases itself from the high-speed UE state or excludes the number of reselections to the same cell minus 1, from the number of cell changes for $T_{crmax}$. For example, if $N_{ping\text{-}pong}$ is 3 and Cell X is reselected four times, the UE counts the cell change number for Cell X as 1 instead of 4.

Figure 5:
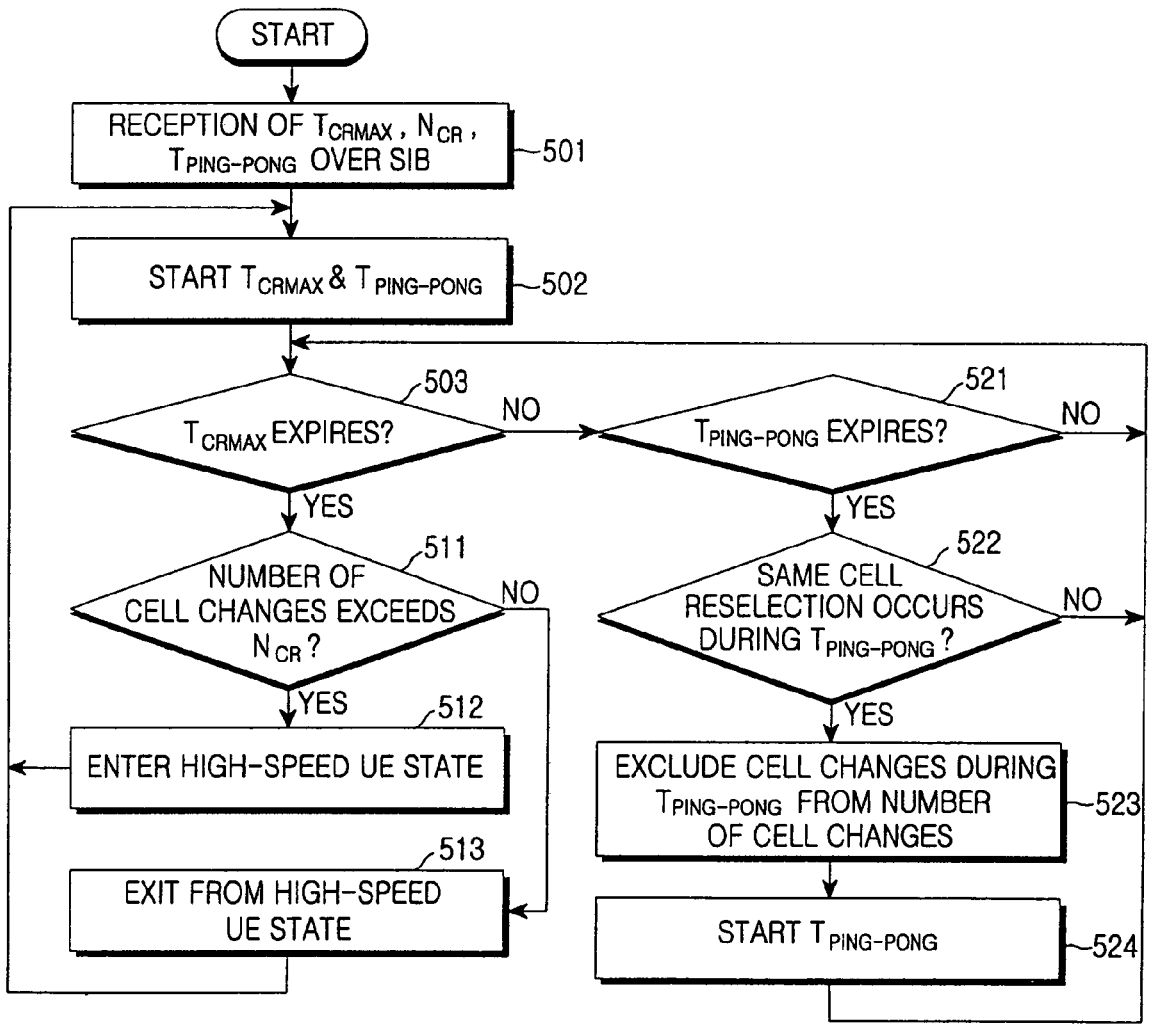
FIG. 5 is a flowchart illustrating an exemplary UE operation in the case of receiving $T_{ping-pong}$ according to a second embodiment of the present invention.

FIG. 5 is a flowchart illustrating an exemplary UE operation in the case of receiving $T_{ping\text{-}pong}$ according to the second embodiment of the present invention. This procedure is different from that illustrated in FIG. 3 in that, for example, the UE does not receive $N_{ping\text{-}pong}$ and operates in a different manner upon expiration of $T_{ping\text{-}pong}$.

Referring to FIG. 5, the UE receives $T_{crmax}$, $N_{cr}$ and $T_{ping\text{-}pong}$ values in an SIB from the serving cell in step 501, and starts timers set to $T_{crmax}$ and $T_{ping\text{-}pong}$, respectively, in step 502. In step 503, the UE monitors the expiration of $T_{crmax}$. If $T_{crmax}$ has not yet expired, the UE monitors the expiration of $T_{ping\text{-}pong}$ in step 521. Upon the expiration of $T_{ping\text{-}pong}$, the UE determines whether the same cell reselection has occurred for $T_{ping\text{-}pong}$ in step 522. If the same cell has been selected at least twice for $T_{ping\text{-}pong}$, the UE excludes the number of cell changes counted for $T_{ping\text{-}pong}$ from the number of cell changes counted for $T_{crmax}$ in step 523, and restarts the timer set to $T_{ping\text{-}pong}$ in step 524.

While not shown, if the same cell reselection has not occurred for $T_{ping\text{-}pong}$ in step 522, the UE includes the number of cell changes counted for $T_{ping\text{-}pong}$ from the number of cell changes counted for $T_{crmax}$. Then, in step 511, the number of cell changes counted for $T_{crmax}$ is compared with $N_{cr}$ to determine whether the UE is a high-speed UE.

Upon expiration of $T_{crmax}$ in step 503, the UE compares the number of cell changes counted for $T_{crmax}$ with $N_{cr}$ in step 511. If the number of cell changes counted for $T_{crmax}$ exceeds $N_{cr}$, the UE enters the high-speed UE state in step 512. If the number of cell changes counted for $T_{crmax}$ is equal to or less than $N_{cr}$, the UE releases itself from the high-speed UE state or is kept in the stationary/slow UE state in step 513.

In the high-speed UE state, the UE reselects to a cell based on a scaled-down $T_{reselection}$ value. If a neighbor cell is maintained higher in ranking than the serving cell for the scaled-down $T_{reselection}$, the UE reselects to the neighbor cell as a new serving cell. If the UE is out of the high-speed UE state, it uses the non-scaled down $T_{reselection}$ value, that is, the original $T_{reselection}$ value.

Figure 6:
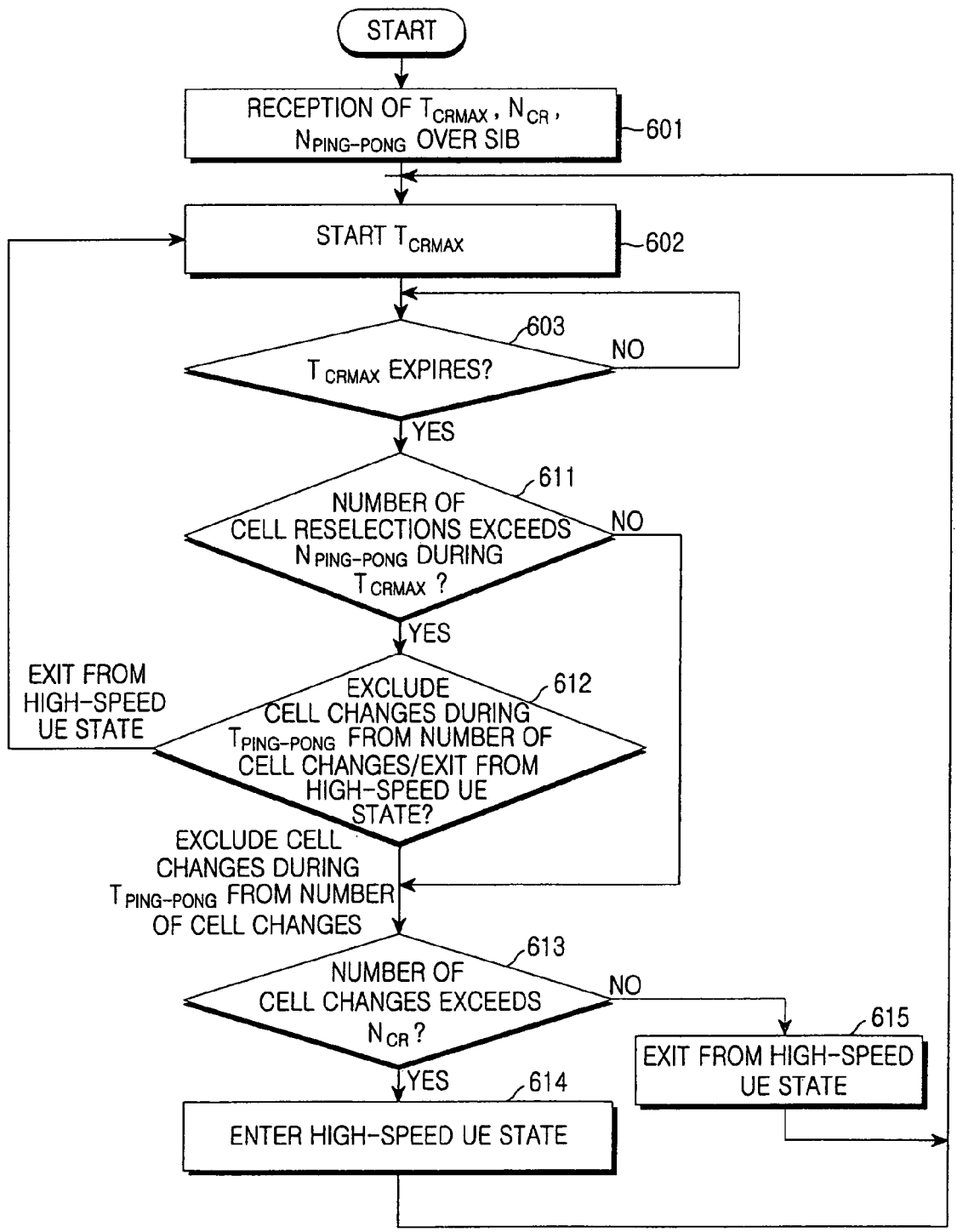
FIG. 6 is a flowchart illustrating an exemplary UE operation in the case of receiving $N_{ping-pong}$ according to the second embodiment of the present invention.

FIG. 6 is a flowchart illustrating an exemplary UE operation in the case of receiving $N_{ping\text{-}pong}$ according to the second embodiment of the present invention.

Referring to FIG. 6, the UE receives $T_{crmax}$, $N_{cr}$ and $N_{ping\text{-}pong}$ values without $T_{ping\text{-}pong}$ in an SIB from the serving cell in step 601, and starts a timer set to $T_{crmax}$ in step 602. In step 603, the UE monitors the expiration of $T_{crmax}$. Upon expiration of $T_{crmax}$, the UE compares the number of reselections to the same cell for $T_{crmax}$ with $N_{cr}$ in step 611.

If the same cell reselection number exceeds $N_{ping-pong}$, the UE releases itself from the high-speed UE state or excludes the same cell reselection number minus 1, from the number of cell changes counted for $T_{crmax}$ in step 612. For example, if Cell X is selected M times (wherein M is greater than $N_{ping-pong}$), the UE counts the number of cell changes to Cell X as 1, discarding the remaining (M−1) cell changes. Both available UE operations are described in FIG. 6. However, if the UE is out of or exits the high-speed UE state in step 612, it returns to step 602 rather than proceeding to step 613.

If the same cell reselection number is equal to or less than $N_{ping-pong}$ in step 611 or if the number of cell changes for the same cell is counted as 1 in step 612, the UE compares the number of cell changes for $T_{crmax}$ with $N_{cr}$ in step 613. If the number of cell changes for $T_{crmax}$ exceeds $N_{cr}$, the UE enters the high-speed UE state in step 614. If the number of cell changes counted for $T_{crmax}$ is equal to or less than $N_{cr}$, the UE releases itself from the high-speed UE state or is kept in the stationary/slow UE state in step 615.

In the high-speed UE state, the UE reselects to a cell based on a scaled-down $T_{reselection}$ value. If a neighbor cell is maintained higher in ranking than the serving cell for the scaled-down $T_{reselection}$, the UE reselects to the neighbor cell as a new serving cell. If the UE is out of the high-speed UE state, it uses the non-scaled down $T_{reselection}$ value, that is, the original $T_{reselection}$ value.

Third Exemplary Embodiment

In the following exemplary embodiment, only a UE operation is defined rather than signaling of new parameters for detecting ping-pong.

Figure 7:
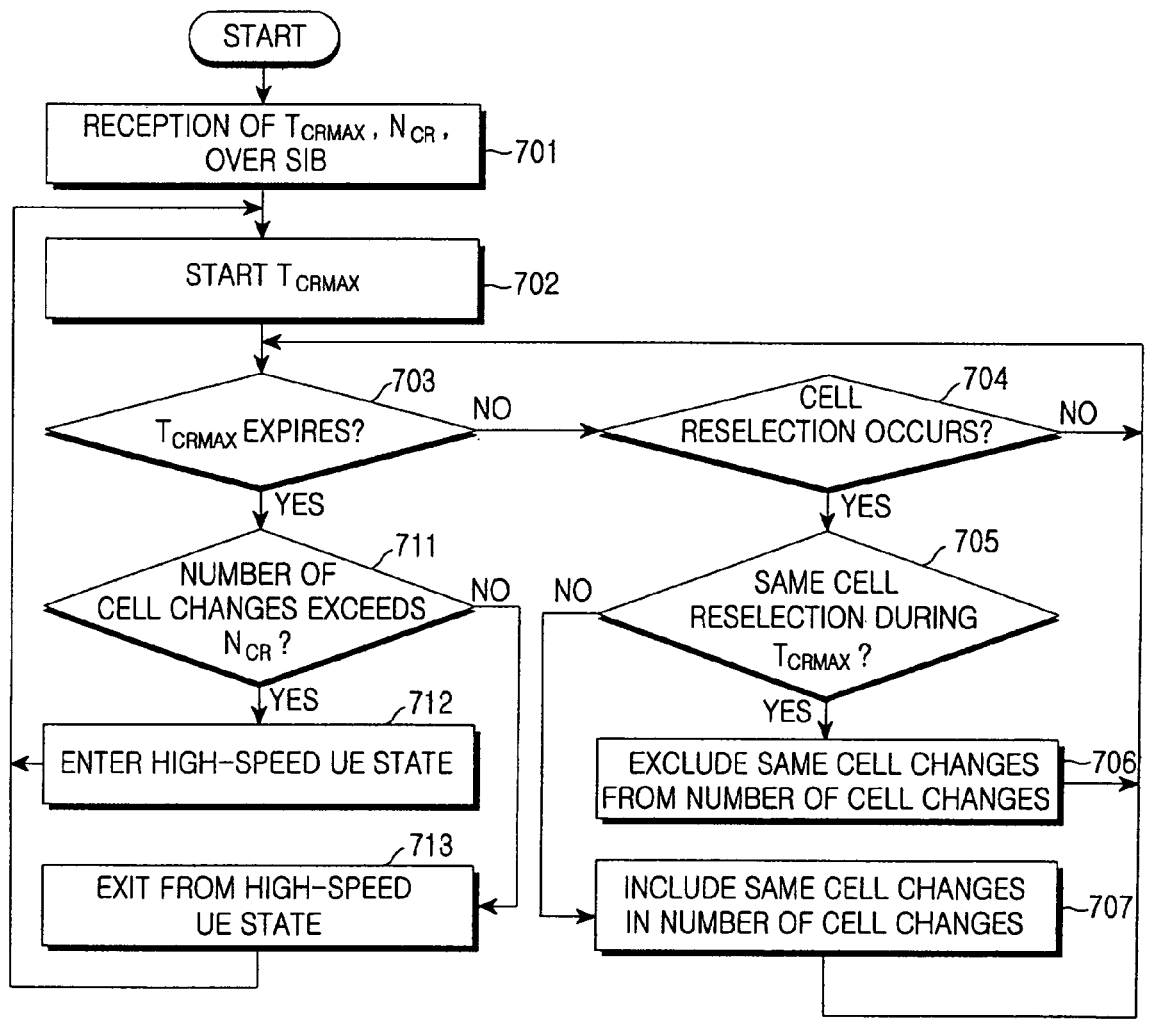
FIG. 7 is a flowchart illustrating an exemplary UE operation according to a third embodiment of the present invention.

FIG. 7 is a flowchart illustrating an exemplary UE operation according to a third embodiment of the present invention.

Referring to FIG. 7, the UE receives $T_{crmax}$ and $N_{cr}$ in an SIB from the serving cell in step 701, and starts a timer set to $T_{crmax}$ in step 702. In step 703, the UE monitors the expiration of $T_{crmax}$. If $T_{crmax}$ has not yet expired, the UE determines whether a cell reselection has occurred in step 704. If it has not, the UE returns to step 703. If it has, the UE determines whether the same cell has been selected repeatedly for $T_{crmax}$ in step 705. If the same cell reselection has been repeated, the UE excludes the number of cell reselections to the cell from the number of cell changes for $T_{crmax}$ in step 706. If the same cell is selected once for $T_{crmax}$, the UE includes the number of cell change to the cell in the cell change number for $T_{crmax}$ in step 707.

Upon the expiration of $T_{crmax}$ in step 703, the UE compares the number of cell changes for $T_{crmax}$ with $N_{cr}$ in step 711. If the number of cell changes for $T_{crmax}$ exceeds $N_{cr}$, the UE enters the high-speed UE state in step 712. If the number of cell changes counted for $T_{crmax}$ is equal to or less than $N_{cr}$, the UE releases itself from the high-speed UE state or is kept in the stationary/slow UE state in step 713.

In the high-speed UE state, the UE reselects to a cell based on a scaled-down $T_{reselection}$ value. If a neighbor cell is maintained higher in ranking than the serving cell for the scaled-down $T_{reselection}$, the UE reselects to the neighbor cell as a new serving cell. If the UE is out of the high-speed UE state, it uses the non-scaled down $T_{reselection}$ value, that is, the original $T_{reselection}$ value.

Figure 8:
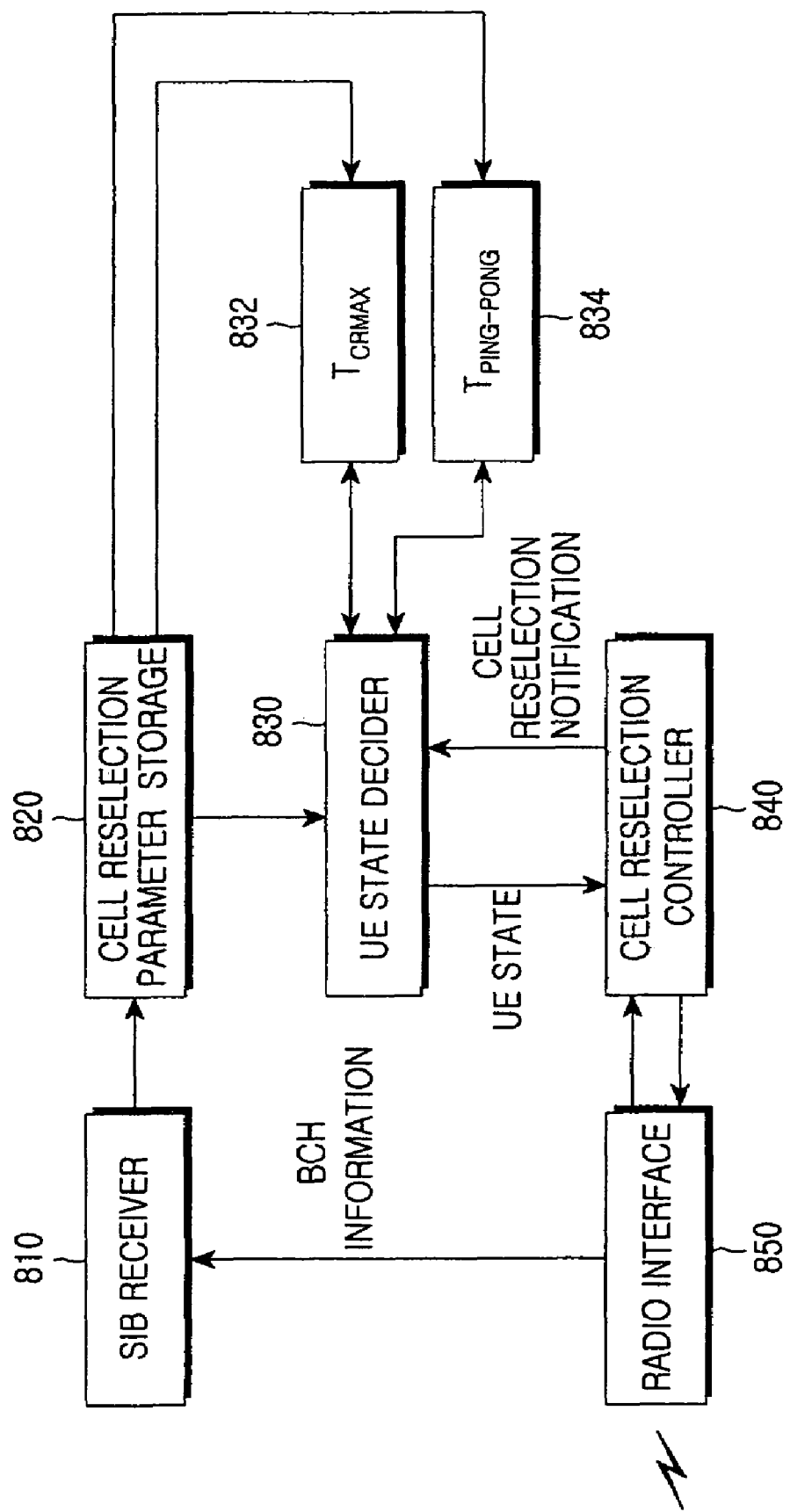
FIG. 8 is a block diagram of an exemplary UE according to an embodiment of the present invention.

FIG. 8 is a block diagram of an exemplary UE according to an embodiment of the present invention. The UE comprises an SIB receiver 810, a cell reselection parameter storage 820, a UE state decider 830, two timers 832 and 834, a cell reselection controller 840, and a radio interface 850. An exemplary operation of the UE of FIG. 8 will now be described below in the context of the first embodiment of the present invention, by way of example.

Referring to FIG. 8, the SIB receiver 810 receives an SIB from the service cell through the radio interface 850. The $T_{crmax}$, $N_{cr}$, $T_{ping-pong}$, $N_{ping-pong}$ and $T_{reselection}$ values are extracted as cell reselection parameters from the SIB and stored in the cell reselection parameter storage 820. Upon receipt of $T_{crmax}$ and $T_{ping-pong}$, the timers 832 and 834 are immediately activated. The $T_{crmax}$ value denotes a timer value for determining whether the UE is a high-speed UE, and $T_{ping-pong}$ denotes a timer value for deciding as to the occurrence of ping-pong caused by a scaled-down $T_{reselection}$. The $N_{cr}$ and $N_{ping-pong}$ values are provided to the UE state decider 830.

The UE state decider 830 receives a cell reselection notification signal from the cell reselection controller 840. This signal contains a cell identifier (ID) identifying a target cell and is provided to the UE state decider 830 at each cell reselection. The UE state decider 830 counts the number of cell changes according to the cell reselection notification signal. Thus, the UE state decider 830 counts the number of cell reselections to each cell and monitors whether the same cell reselection has occurred.

The UE state decider 830 determines whether a $T_{crmax}$ timeout has been generated from the $T_{crmax}$ timer 832, while counting the number of cell changes. If the $T_{crmax}$ timeout has not yet been generated, the UE state decider 830 determines whether a $T_{ping-pong}$ timeout has been generated from the $T_{ping-pong}$ timer 834. Upon generation of the $T_{ping-pong}$ timeout signal, the UE state decider 830 checks the count of reselections to the same cell for $T_{ping-pong}$ using the cell reselection notification signal and compares the same cell reselection number with $N_{ping-pong}$.

If the same cell reselection number for $T_{ping-pong}$ exceeds $N_{ping-pong}$, the UE state decider 830 releases itself from the high-speed UE state or excludes the number of cell changes for $T_{ping-pong}$ from the number of cell changes for $T_{crmax}$. The number of cell changes for $T_{ping-pong}$ can be the number of reselections to the same cell or the total number of cell changes to different cells for $T_{crmax}$.

However, upon generation of the $T_{crmax}$ timeout signal, the UE state decider 830 compares the number of cell changes for $T_{crmax}$ with $N_{cr}$. If the number of cell changes for $T_{crmax}$ exceeds $N_{cr}$, the UE state decider 830 determines that the UE is in the high-speed UE state and correspondingly notifies the cell reselection controller 840. However, if the number of cell changes for $T_{crmax}$ is equal to or less than $N_{cr}$, the UE state decider 830 determines that the UE is in the stationary/slow UE state and correspondingly notifies the cell reselection controller 840.

The cell reselection controller 840 determines whether to perform cell reselection and to which cell the UE is to reselect based on the measurement for each cell. In the high-speed UE state, the cell reselection controller 840 performs cell reselection using a scaled-down $T_{reselection}$. If a neighbor cell is kept higher in ranking than the serving cell for the scaled-down $T_{reselection}$, the cell reselection controller 840 sends a cell reselection indication signal to the radio interface 850 in order to set the neighbor cell as a new serving cell. However, if the UE is in the stationary/slow UE state, the cell reselection controller 840 uses the original $T_{reselection}$. If a neighbor cell is kept higher in ranking than the serving cell for the original $T_{reselection}$, the cell reselection controller 840 sends a cell reselection indication signal to the radio interface 850 in order to set the neighbor cell as a new serving cell. Upon receipt of the cell reselection indication signal, the radio interface 850 lists for a broadcast channel from the new serving cell, considering the indicated neighbor cell to be the new serving cell.

In accordance with embodiments of the present invention as described above, continuous ping-pong effects are avoided in cell reselection, which are caused as a stationary/slow UE wrongly uses a cell reselection parameter ($T_{reselection}$) set for a high-speed UE. Therefore, resources are saved for the UE and the system and the communication quality of the UE is improved.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A cell reselection method for preventing ping-pong in a mobile communications system, comprising the steps of:
   acquiring first and second duration thresholds and first and second occurrence number thresholds for controlling a cell reselection procedure, the second duration threshold being shorter than the first duration threshold and the second occurrence number threshold being less than the first occurrence number threshold;
   setting a user equipment (UE) to a high-speed state if the number of cell reselections of the UE to the same cell during the second duration threshold exceeds the second occurrence number threshold;
   setting the UE to a non-high-speed state if the number of cell changes of the UE during the first duration threshold is equal to or less than the first occurrence number threshold;
   setting the UE to the high-speed state if the number of cell reselections of the UE to the same cell during the second duration threshold is equal to or less than the second occurrence number threshold and if the number of cell changes of the UE during the first duration threshold exceeds the first occurrence number threshold;
   selectively performing cell reselection according to a predetermined cell reselection time limit in the non-high-speed state in the UE; and
   selectively performing cell reselection according to a scaled-down value of the predetermined cell reselection time limit in the high-speed state in the UE.

2. The cell reselection method of claim 1, wherein the step of cell reselection in the non-high-speed state comprises the step of:
   reselecting to a neighbor cell sensed by the UE if the neighbor cell is kept higher in cell reselection ranking than a serving cell for the predetermined cell reselection time limit.

3. The cell reselection method of claim 1, wherein the step of cell reselection in the high-speed state comprises the step of:
   reselecting to a neighbor cell sensed by the UE if the neighbor cell is kept higher in cell reselection ranking than the serving cell for the scaled-down cell reselection time limit.

4. The cell reselection method of claim 1, wherein the first and second duration thresholds and the first and second occurrence number thresholds are comprised in a system information block (SIB) transmitted from the serving cell.

5. The cell reselection method of claim 4, wherein the SIB further comprises the cell reselection time limit and a scaling factor for scaling down the cell reselection time limit.

6. A cell reselection method for preventing ping-pong in a mobile communications system, comprising the steps of:
   acquiring first and second duration thresholds and first and second occurrence number thresholds for controlling a cell reselection procedure, the second duration threshold being shorter than the first duration threshold and the second occurrence number threshold being less than the first occurrence number threshold;
   excluding, if the number of cell reselections of a user equipment (UE) to the same cell during the second duration threshold exceeds the second occurrence number threshold, the number of cell reselections during the second duration threshold or the number of cell reselections to the same cell during the second duration threshold from the number of cell changes during the first duration threshold;
   setting the UE to a non-high-speed state if the number of cell changes during the first duration threshold is equal to or less than the first occurrence number threshold;
   setting the UE to a high-speed state if the number of cell reselections to the same cell during the second duration threshold is equal to or less than the second occurrence number threshold and if the number of cell changes during the first duration threshold exceeds the first occurrence number threshold;
   selectively performing cell reselection according to a predetermined cell reselection time limit in the non-high-speed state; and
   selectively performing cell reselection according to a scaled-down value of the predetermined cell reselection time limit in the high-speed state.

7. The cell reselection method of claim 6, wherein the step of cell reselection in the non-high-speed state comprises the step of:
   reselecting to a neighbor cell sensed by the UE if the neighbor cell is kept higher in cell reselection ranking than a serving cell for the predetermined cell reselection time limit.

8. The cell reselection method of claim 6, wherein the step of cell reselection in the high-speed state comprises the step of:
   reselecting to a neighbor cell sensed by the UE if the neighbor cell is kept higher in cell reselection ranking than the serving cell for the scaled-down cell reselection time limit.

9. The cell reselection method of claim 6, wherein the first and second duration thresholds and the first and second occurrence number thresholds are comprised in a system information block (SIB) transmitted from the serving cell.

10. The cell reselection method of claim 9, wherein the SIB further comprises the cell reselection time limit and a scaling factor for scaling down the cell reselection time limit.

11. A user equipment (UE) apparatus for cell reselection to prevent ping-pong in a mobile communications system, comprising:
    a parameter storage for acquiring and storing first and second duration thresholds and first and second occurrence number thresholds for controlling a cell reselection procedure, the second duration threshold being shorter than the first duration threshold and the second occurrence number threshold being less than the first occurrence number threshold;
    first and second timers set to the first and second duration thresholds, respectively;
    a UE state decider for;
        excluding, if the number of cell reselections to the same cell exceeds the second occurrence number threshold until the second timer expires, the number of cell reselections during the second duration threshold or the number of cell reselections to the same cell during the second duration threshold from the number of cell changes during the first duration threshold;

setting the UE to a non-high-speed state if the number of cell changes is equal to or less than the first occurrence number threshold until the first timer expires; and setting the UE to a high-speed state if the number of cell reselections to the same cell is equal to or less than the second occurrence number threshold until the second timer expires and if the number of cell changes exceeds the first occurrence number threshold until the first timer expires; and a cell reselection controller for selectively performing cell reselection according to a predetermined cell reselection time limit in the non-high-speed state, and performing cell reselection according to a scaled-down value of the predetermined cell reselection time limit in the high-speed state.

12. The UE apparatus of claim 11, wherein the UE state decider is configured to:

set the UE to the high-speed state if the number of reselections to the same cell during the second duration threshold is equal to or less than the second occurrence number threshold and the number of cell changes during the first duration threshold exceeds the first occurrence number threshold.

13. The UE apparatus of claim 11, wherein if the UE is in the non-high-speed state, the cell reselection controller is configured to:

perform cell reselection to a neighbor cell if the neighbor cell is kept higher in cell reselection ranking than a serving cell for the predetermined cell reselection time limit.

14. The UE apparatus of claim 11, wherein if the UE is in the high-speed state, the cell reselection controller is configured to:

perform cell reselection to a neighbor cell if the neighbor cell is kept higher in cell reselection ranking than the serving cell for the scaled-down cell reselection time limit.

15. The UE apparatus of claim 11, further comprising:

a system information block (SIB) receiver for receiving an SIB from the serving cell, extracting the first and second duration thresholds and the first and second occurrence number thresholds from the SIB, and providing the first and second duration thresholds and the first and second occurrence number thresholds to the parameter storage.

16. The UE apparatus of claim 15, wherein the SIB further comprises the cell reselection time limit and a scaling factor for scaling down the cell reselection time limit.

* * * * *